March 16, 1937.  H. S. WOODRUFF  2,074,294
FILTER
Filed Nov. 16, 1935  2 Sheets-Sheet 1
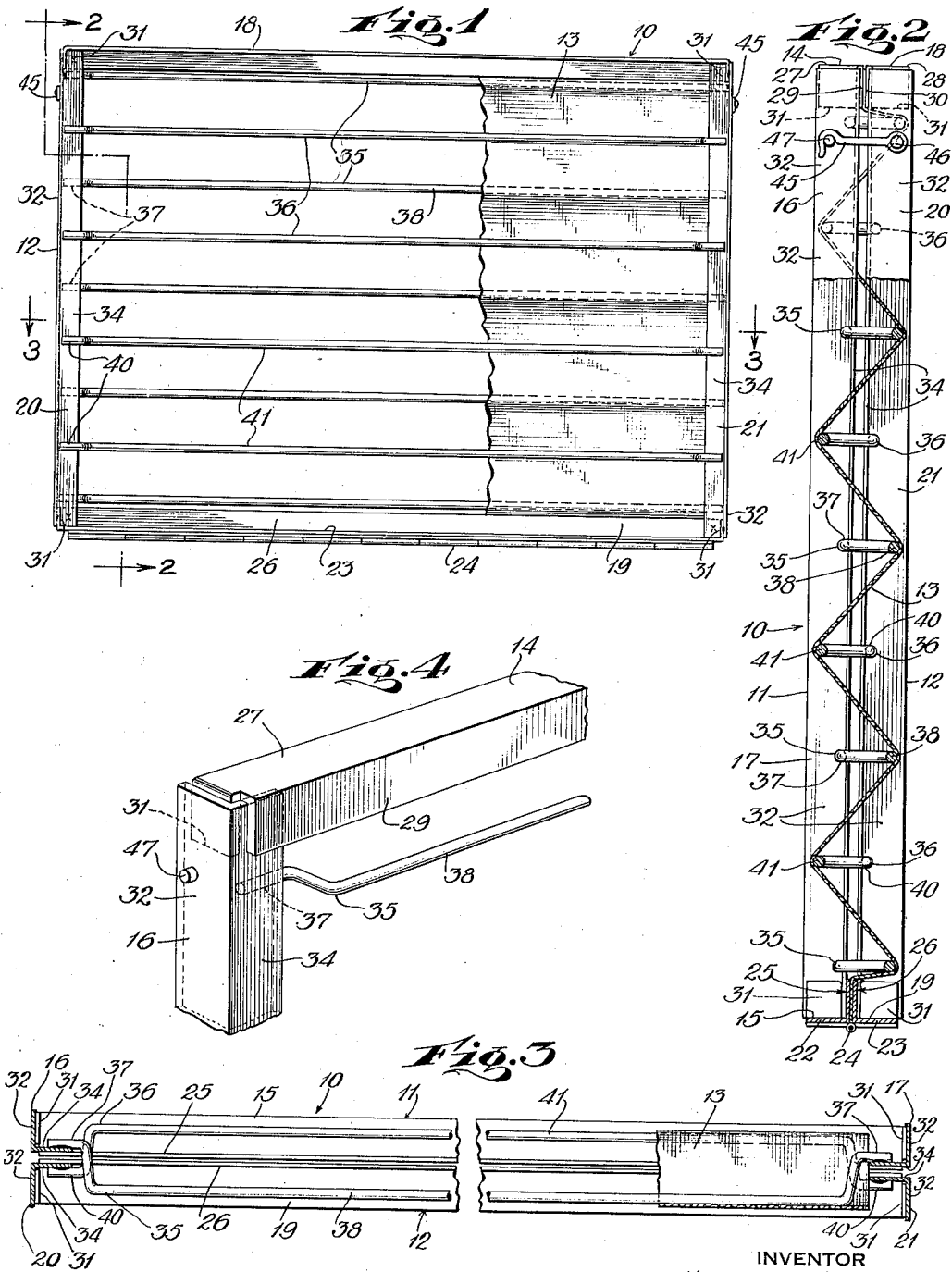
INVENTOR
HENRY S. WOODRUFF
BY
his ATTORNEY March 16, 1937. H. S. WOODRUFF 2,074,294
FILTER
Filed Nov. 16, 1935 2 Sheets-Sheet 2
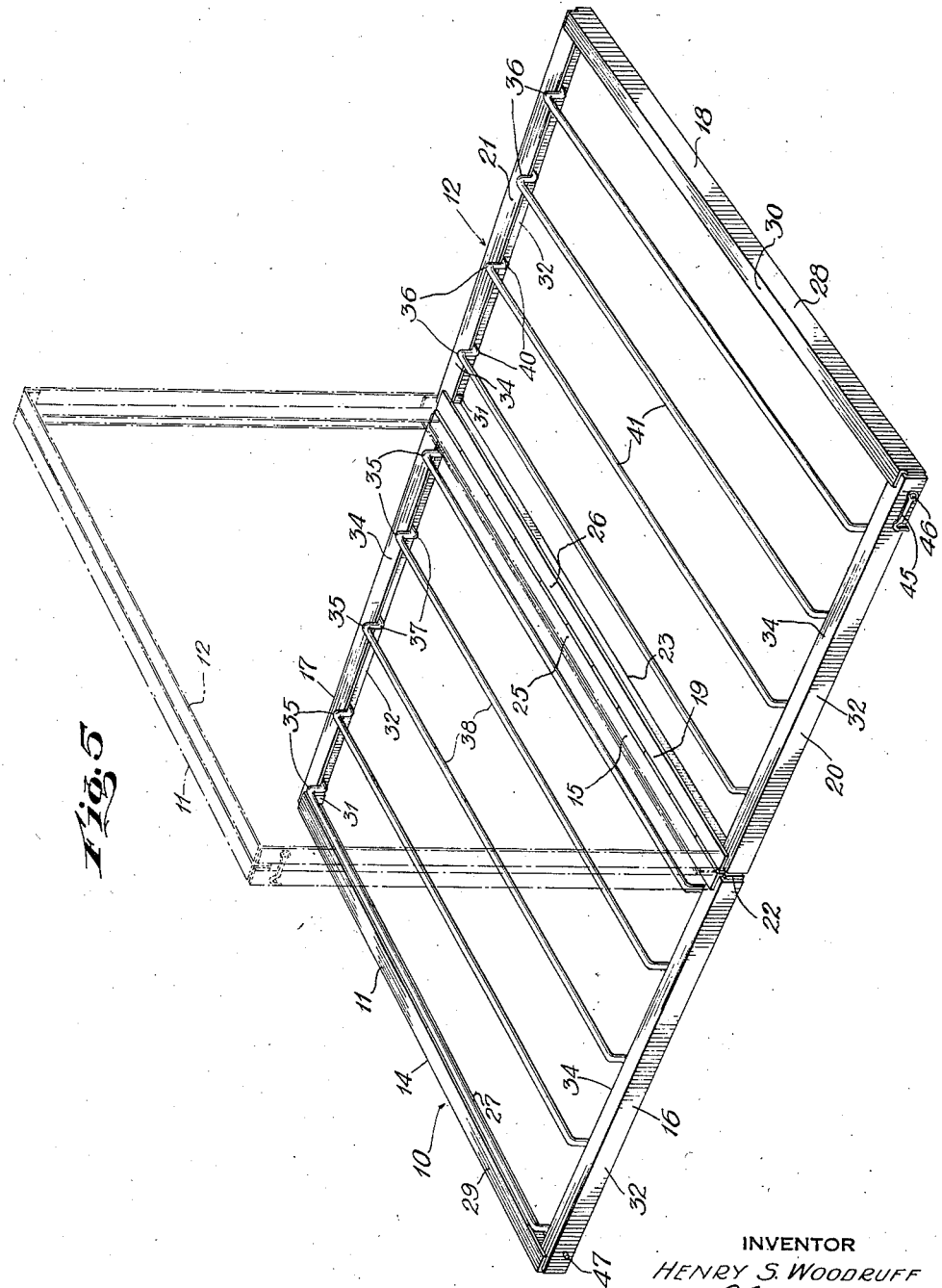
INVENTOR
HENRY S. WOODRUFF
BY
ATTORNEY Patented Mar. 16, 1937

2,074,294

UNITED STATES PATENT OFFICE 2,074,294

FILTER

Henry S. Woodruff, Larchmont, N. Y., assignor to American Radiator Company, New York, N. Y., a corporation of New Jersey Application November 16, 1935, Serial No. 50,089

5 Claims. (Cl. 183—71)

My invention relates to filter devices and more particularly to a filter of the type having a filtering element which, when it becomes laden with particles filtered out of the fluid passing therethrough, may be readily replaced by a clean filtering element.

In the drawings and specification, I have shown and described one preferred form of filter which is suitable for use in room ventilators for removing the dust, dirt, pollen, etc. from the air entering the room through the ventilator. It is to be understood, however, that insofar as certain of the broader aspects of my invention are concerned, it is not to be considered as being limited to use in room ventilating devices, for the novel features thereof may be incorporated in any device or apparatus where it is desired that particles of matter be removed from a fluid.

Objects of my invention are comprised in the provision of a filter which is simple in construction; inexpensive to manufacture; one which provides a relatively large filtering area for a given cross-section of fluid passage and at the same time offers a relatively small amount of resistance to the flow of fluid through the passage; and one which makes possible the use of a replaceable filtering element which is relatively inexpensive, thereby providing for a minimum cost of operation to the user.

The invention consists in the novel construction and combination of parts, to be more fully described hereinafter, and the novelty of which will be particularly pointed out and distinctly claimed.

In the accompanying drawings, to be taken as a part of this specification, I have fully and clearly illustrated a preferred embodiment of my invention, in which drawings—

Fig. 1 is a view in side elevation of one preferred form of my improved filter, the filtering element being broken away to more clearly illustrate the construction of the remainder of the device.

Fig. 2 is an enlarged view of the filter shown in Fig. 1, the view being partially in end elevation and partially in vertical section and being taken on the line 2—2 of Fig. 1.

Fig. 3 is an enlarged horizontal plan section taken on the line 3—3 of Fig. 1.

Fig. 4 is an enlarged fragmentary perspective view of an upper corner of one of the frame members of the filter; and Fig. 5 is a perspective view showing in full lines the filter frame as separated and in position to receive the filtering element, and showing in dotted lines the frame members as arranged in face-to-face or operative position.

Referring now in detail to the construction illustrated, the reference numeral 10 indicates, in its entirety, a preferred embodiment of my improved filter. Hereinafter, I have described that part of the structure of Figs. 1 and 2 nearest the top of the sheet as being the top of the filter, the lower part of Figs. 1 and 2 as the bottom of the filter, and the structure at the left-hand and right-hand sides of Fig. 1 as being the ends of the filter. It is to be understood, however, that this is solely for the purposes of description, and that the filter may be arranged in any desired position without departing from the spirit of the present invention.

The filter 10 comprises a pair of frame members 11 and 12 arranged face-to-face when in operative relation to define a passage for the flow of air therethrough. The filter also comprises a filtering element 13 extending across the filter in zigzag formation so as to provide the maximum surface of filter material for contacting with the air. The air may flow through the filter in either direction, as viewed in Fig. 2.

Each of the frame members 11 and 12 is composed of top, bottom and end members which are right-angle in cross-section and are suitably secured together at their meeting ends by spot welding. The frame member 11 comprises a top member 14, a bottom member 15 and end members 16 and 17. Likewise, the frame member 12 comprises a top member 18, a bottom member 19, and end members 20 and 21.

The bottom members 15 and 19 are provided with horizontal flanges 22 and 23 respectively, to which are secured opposite portions of a hinge 24, the latter permitting the separation of the frame members 11 and 12 and assuring their reassembly in operative or face-to-face relation. The bottom members 15 and 19 are also provided with vertical flanges 25 and 26 respectively, which are arranged in the plane of meeting of the frame members 11 and 12 and hold firmly therebetween the lower end of the filtering element 13.

The top members 14 and 18 are provided with horizontal flanges 27 and 28 respectively, and with vertical flanges 29 and 30, the latter being arranged parallel to one another and in the plane of meeting of the frame members, thereby serving to hold therebetween the upper end of the filtering element 13.

The bottom members 15 and 19 and the top members 14 and 18 are also provided with bent over end flanges 31 which are disposed within and spot welded to end flanges 32 of end members 16, 17, 20 and 21 (see Fig. 4). The vertical flanges 25, 26, 29 and 30 are spot welded at their ends to flanges 34 of end members 16, 17, 20 and 21, respectively. This provides an extremely strong and rigid frame construction.

The frame members 11 and 12 are provided with sets of rods 35 and 36 respectively, which serve to hold the filtering element 13 in zigzag formation. Each rod of the set 35 comprises end portions 37 which are secured by spot welding to the flanges 34 of end members 16 and 17 and mid portions 38 which connect the end portions 37 and extend across the air passage and serve as the supporting means for the filtering element 13. Likewise, each of the set of rods 36 comprises end portions 40 spot welded to flanges 34 of end members 20 and 21 and mid portions 41 extending across the air passage and holding the filtering element. The mid portions 38 of the rods 35 are arranged in parallel equally spaced relation and outside of the confines of their respective frame member 11. The mid portions 41 of the rods 36 are also arranged in parallel spaced relation to one another and in parallel and staggered relation with respect to the mid portions 38. In the drawings, I have shown five rods on the frame member 11 and four rods on the frame member 12. It is to be understood, however, that the number shown is solely for the purpose of illustrating the principles of the invention and that a less or greater number of rods may be used without departing from the spirit thereof.

The frame members 11 and 12 are detachably held in face-to-face or operative relation by hooks 45 pivotally carried by pins 46 secured to the flange members 32 of the end members 20 and 21 respectively, and engaging pins 47 carried by the flange members 32 of end members 16 and 17 respectively.

By reason of the construction described, the frame members may be readily separated and moved about the axis of the hinge connection for the purpose of removing a filtering element 13 and replacing it with a clean one. This is made possible by the rods 35 and 36 being arranged in staggered relation to one another and out of the confines of their respective frame members and by the rods engaging the filtering element at the side thereof which is remote from their respective frame members. The filtering element comprises a web or sheet of filtering material which may be formed of any suitable material such, for example, as cloth or paper. Also, if desired, the filtering material may be previously folded or creased along the lines where it will engage the rods 35 and 36, so as to facilitate its proper arrangement on the rods when the frame members are secured in operative relation. Such a folding or creasing operation would add very little to the cost of an inexpensive filtering element such as has been described.

The structure described is simple, inexpensive to manufacture, and is strong and durable. On account of the zigzag arrangement of the filtering element 13, an extremely large filtering area is provided for a given cross-section of air passage and therefore the filtering element will offer a relatively small amount of resistance to the flow of air through the passage. As the filtering surface is relatively large, the filtering element will need replacing less frequently. Furthermore, on account of the manner of supporting the filtering element and the feature of the separation of the frames, the inexpensive filtering elements may be quickly and easily replaced when dirty.

What I claim and desire to secure by Letters Patent of the United States is:—

1. A filter comprising a pair of separable hollow frame members arranged in face-to-face relation and providing a passage for the flow of air therethrough, a set of spaced rods carried by each of the frame members and extending across the passage in the same general direction and in the direction of extent of the rods of the other frame member, each rod including a mid portion extending across the passage and arranged in the plane of the other frame member and end portions fixedly securing the ends of the mid portion to their respective frame member, the rods of one frame member being staggered with respect to the rods of the other frame member so as to permit their passing one another when the frame members are separated or placed together in face-to-face relation, and a web of filtering material extending across said passage in a direction at right angles to the direction of extent of the rods and being supported by each rod on the side thereof remote from its respective frame member so as to permit the separation of the frame members and the ready removal and replacement of a web of filtering material.

2. A filter comprising a pair of separable hollow frame members arranged in face-to-face relation and providing a passage for the flow of air therethrough, a set of spaced rods carried by each of the frame members and extending across the passage in the same general direction and in the direction of extent of the rods of the other frame member, each rod including a mid portion extending across the passage and arranged in the plane of the other frame member and end portions fixedly securing the ends of the mid portion to their respective frame member, the rods of one frame member being staggered with respect to the rods of the other frame member so as to permit their passing one another when the frame members are separated or placed together in face-to-face relation, a web of filtering material extending across said passage in a direction at right angles to the direction of extent of the rods and being supported by each rod on the side thereof remote from its respective frame member so as to permit the separation of the frame members and the ready removal and replacement of a web of filtering material, and clamping members carried by each of the frame members and arranged in opposed relation to one another when the frame members are in operative position and engaging opposite sides of the end portions of said web of filtering material so as to hold the latter tightly therebetween and prevent accidental displacement.

3. A filter comprising a pair of separable hollow frame members arranged in face-to-face relation and providing a passage for the flow of air therethrough, means for hingedly connecting the frame members along one side thereof and providing for the movement of the frame members about the axis of the hinged connection and into and out of face-to-face relation, a set of spaced rods carried by each of the frame members and extending across the passage in the same general direction and in the direction of extent of the rods of the other frame member, each rod including a mid portion extending across the passage and arranged in the plane of the other frame member and end portions fixedly securing the ends of the mid portion to their respective frame member, the rods of one frame member being staggered with respect to the rods of the other frame member so as to permit their passing one another when the frame members are separated or brought together in face-to-face relation, and a web of filtering material extending across said passage in a direction at right angles to the direction of extent of the rods and being supported by each rod on the side thereof remote from its respective frame member so as to permit the separation of the frame members and the ready removal and replacement of a web of filtering material.

4. A filter comprising a pair of separable hollow frame members arranged in face-to-face relation and providing a passage for the flow of air therethrough, means for hingedly connecting the frame members along one side thereof and providing for the movement of the frame members about the axis of the hinged connection into and out of face-to-face relation, a set of spaced rods carried by each of the frame members and extending across the passage in the same general direction and in the direction of extent of the rods of the other frame member, each rod including a mid portion extending across the passage and arranged in the plane of the other frame member, and end portions fixedly securing the ends of the mid portion to their respective frame member, the rods of one frame member being staggered with respect to the rods of the other frame member so as to permit their passing one another when the frame members are separated or placed together in face-to-face relation, a web of filtering material extending across said passage in a direction at right angles to the direction of extent of the rods and being supported by each rod on the side thereof remote from its respective frame member so as to permit the separation of the frame members and the ready removal and replacement of a web of filtering material, and clamping members carried by each of the frame members and arranged in opposed relation to one another when the frame members are in operative position and engaging opposite sides of the end portions of said web of filtering material so as to hold the latter tightly therebetween and prevent accidental displacement.

5. A filter of the character described, comprising a pair of rectangular hollow frames arranged in face-to-face relation and providing a passage for the flow of air therethrough, a set of spaced rods carried by each of the frame members and extending across the passage in substantially spaced parallel relation from one side of their respective frame to the opposed parallel side thereof, each rod including a mid portion extending across the passage in the plane of the other frame member and end portions fixedly securing the ends of the mid portion to their respective frame member, the mid portions of the rods of one frame member being arranged parallel to and in staggered relation with respect to the mid portions of the rods of the other frame member so as to permit their passing one another when the frame members are separated or brought together in face-to-face relation, and a web of filtering material extending across said passage in a direction at right angles to the direction of extent of the rods and being supported by each rod on the side thereof remote from its respective frame member so as to permit the separation of the frame members and the ready removal and replacement of a web of filtering material.

HENRY S. WOODRUFF.